UNITED STATES PATENT OFFICE.

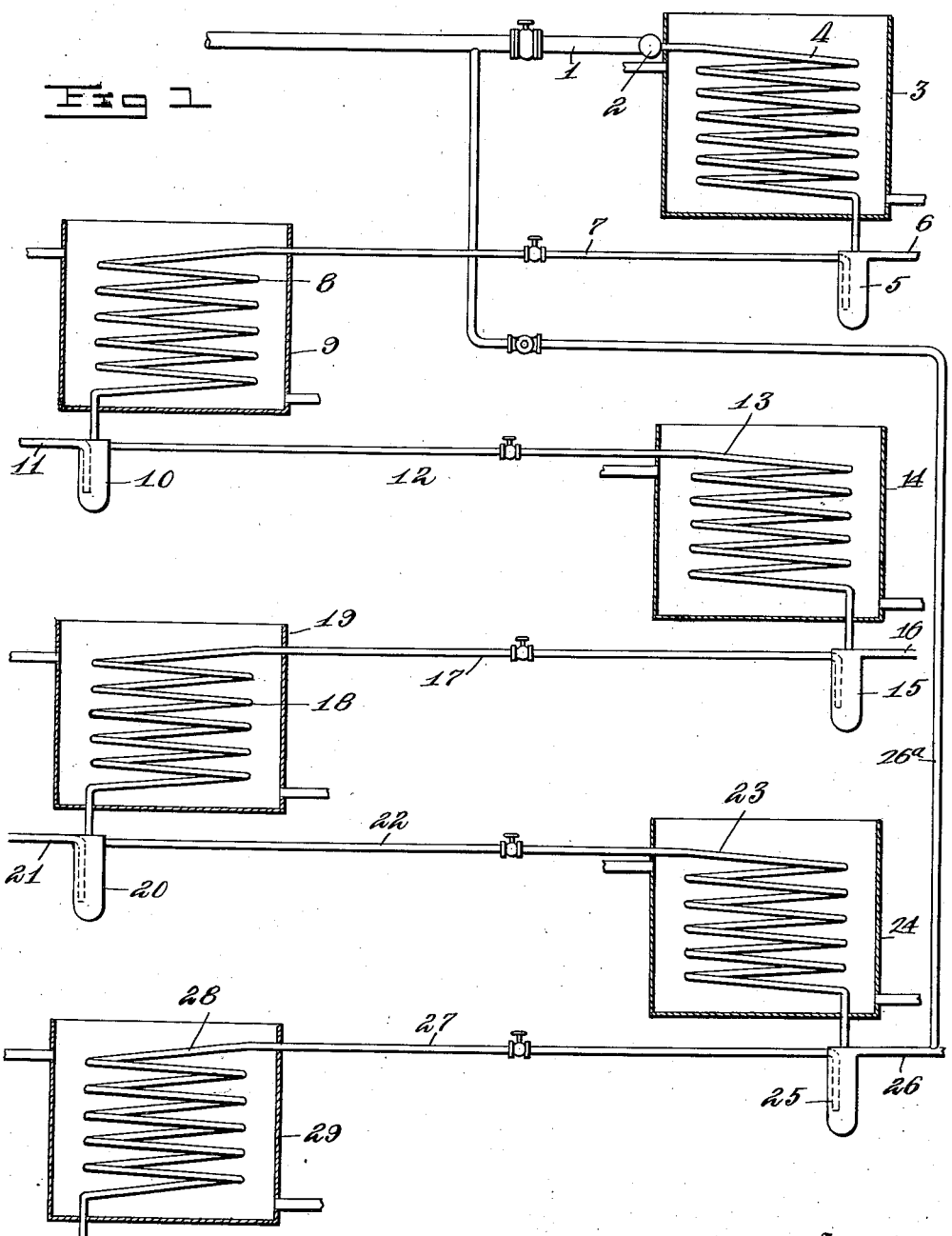

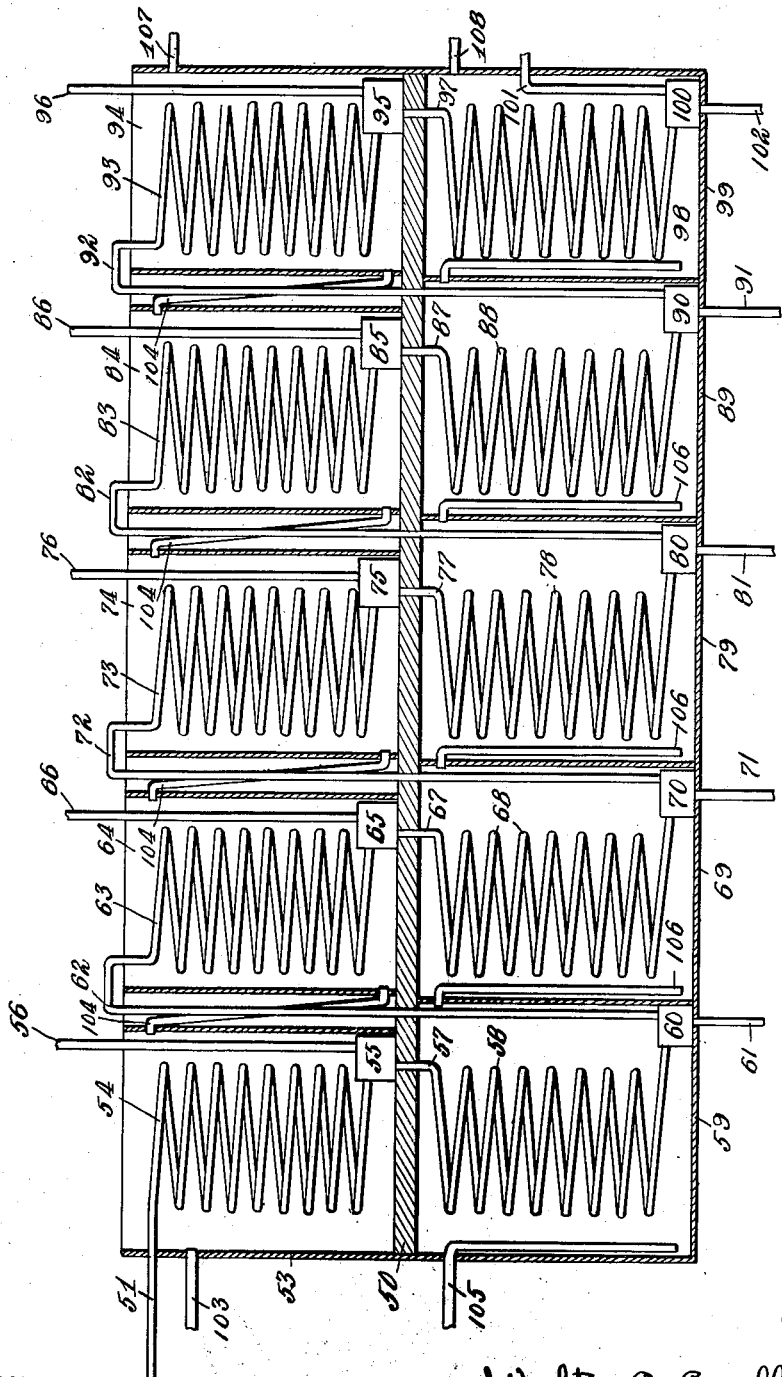

WALTER O. SNELLING, OF PITTSBURGH, PENNSYLVANIA.

PROCESS OF AND APPARATUS FOR DISTILLATION.

1,186,855.  Specification of Letters Patent. Patented June 13, 1916.

Application filed September 28, 1914. Serial No. 863,918.

*To all whom it may concern:*

Be it known that I, WALTER O. SNELLING, a citizen of the United States, residing at Pittsburgh, in the county of Allegheny and State of Pennsylvania, have invented certain new and useful Improvements in Processes of and Apparatus for Distillation, of which the following is a specification.

This invention relates to processes of and apparatus for distillation; and it comprises a method of distillation application to petroleum products, and particularly applicable to the manufacture of commercial pentane, turpentine substitutes, rubber solvents and other definite low boiling distillates from gasolene, natural gas naphtha, etc., but also applicable to other materials wherein the vapors of volatile materials coming from a suitable source, which may be an ordinary still, are subjected to a plurality of fractional condensations and reëvaporations at adjusted temperatures until a liquid product of desired boiling point is obtained; and it further comprises as a new organization of apparatus elements the combination with a source of vapors of a series of successive fractional condensers and reëvaporators in such sequence that said vapors are first fractionally condensed at an adjusted temperature, the condensate fractionally reëvaporated at a somewhat higher adjusted temperature, the vapors fractionally condensed and so on as many times as may be desired; all as more fully hereinafter set forth and as claimed.

The ordinary methods of distillation by the use of column stills and the like are, in the main, only applicable to the separation of 2-component liquids like a mixture of alcohol and water. For more complex liquids, such as the petroleum products, they can only be used to produce materials of average boiling points and cannot be relied upon to produce any one definite substance. For example, while petroleum may be separated into a plurality of "cuts" or fractions, such as gasolene, kerosene, etc., by ordinary stills, it is not practicable to produce any definite single material such as a hexane or an octane; or indeed any material of constant boiling point, or of a boiling point constant within, say, 5 degrees.

It is the object of the present invention to remedy this defect and provide a method of and apparatus for, isolating constant-boiling material from complex liquids like petroleum. It is applicable to the production or isolation of very many chemical individuals from the complex mixture of such individuals afforded by petroleum oil, such as the various pentanes, the hexanes, the heptanes, the octanes, etc., and also to the production of commercial products which are desired to be of constant boiling point, such as turpentine substitute, rubber solvent, etc. For the sake of example, however, I shall hereinafter describe it more particularly as applied to the production of substantially pure, normal pentane, it being understood that other hydrocarbons may be produced in the same way as, and indeed simultaneously with, the production of the pentane and that the particular ranges of temperatures employed refer only to normal pentane. In this description for the sake of uniformity centigrade temperatures are used throughout. As so described the temperatures range on both sides of the boiling point of pentane, 37° C. Where another substance, such as normal hexane, is produced the temperatures will naturally range in the same way on both sides of its boiling point; in the case of normal hexane, on both sides of 71.5° C. In this method as hereinafter described, a pentane product may be readily produced which will boil as a whole within, say, 2 degrees centigrade; and by repetition of the treatment the boiling range may be lessened as much as may be desired.

Chemically there are three pentanes contained in gasolene, natural gas gasolene, etc.: "normal" pentane having a boiling point of 37° C.; "secondary" pentane with a boiling point of 30° and "tertiary" pentane with a boiling point of 9.5°. Any of the three can be made in the present method.

As the raw material for making normal pentane I may use commercial gasolene or the gasolene vapors coming from the distillation of petroleum. Or I may employ the liquid material condensed by cold and pressure from natural gas and known as natural gas gasolene. Gasolene is a very complex material containing large amounts of higher-boiling hydrocarbons since as made at the present date it comprises everything liquefiable which can be distilled from petroleum at a temperature below say 165° C. In ordinary practice petroleum is distilled at a gradually increasing temperature and everything which comes over below a vapor temperature of 165° is commercially called gasolene. The condensate comprises, together with higher boiling oils, a large proportion of bodies as low boiling as the pentanes. Natural gas gasolene is much more volatile than commercial gasolene and contains a larger proportion of pentane.

In making normal pentane of a boiling point between say, 35° and 38°, gasolene vapors from any suitable still or other source are first led through a condenser maintained at about 27° C. Vapors of gasolene coming from the distillation of crude petroleum may be directly fed through the condenser; or similar vapors may be produced from liquid commercial or natural gas gasolene. The condenser is best a tubular condenser immersed in a comparatively large body of cooling and temperature regulating liquid, such as water. In this condenser a certain proportion of liquid containing normal pentane will condense. Uncondensed vapors are led off to a point of discharge. They may be sent through another system analogous to that about to be described for the purpose of obtaining other products than pentane. The condensate is now led through a fractional vaporizing device to evaporate part of it. This vaporizing device may also advantageously be a worm in a body of heating and temperature-controlling fluid. For the present purpose it may be kept at 47°. The unevaporated liquid is led to a point of discharge. It may be converted into vapors and subjected to another similar treatment for the purpose of making another definite product than pentane. The vapors produced in the fractional evaporator just described are now led through another fractional cooling device kept at, say, 32. Uncondensed vapors are led off for other treatment and condensed liquid is sent through another vaporizing coil kept at, say, 42. Unvaporized liquid is led off and the vapors are sent through a cooling coil at, say, 35°. The vapors from this cooling coil are led off and the condensate will be normal pentane boiling at 36–38°. To secure a closer boiling range, the treatment in a similar manner may be repeated as often as may be deemed desirable.

In the above process it will be observed that vapors containing a substance boiling at 37° are sent through a condenser at a materially lower temperature (here 10 degrees) and uncondensed vapors rejected. The condensed liquid is then evaporated at a temperature materially higher (here 10 degrees) than the boiling point of the substance and unevaporated liquid rejected. The vapors are then cooled at a temperature quite near but below the boiling point of pentane; here five degrees below. Then the liquid is reëvaporated at a temperature near but above the boiling point; here five degrees. The vapors are finally condensed at a temperature very near but below the boiling point of pentane; two degrees lower. The same procedure, with the necessary variations in specific temperatures can be followed to make secondary pentane of boiling point 30°; normal hexane of boiling point 71.5°; heptane of 96° boiling point, etc. Any of the stated materials, and many others, may be obtained from gasolene and kerosene by the method specifically described with regard to normal pentane. With similar apparatus working in parallel with the pentane system, they can be made simultaneously.

In the accompanying illustration I have shown, more or less diagrammatically, certain embodiments of apparatus elements within the present invention and useful in connection with the described process.

In this showing:—Figure 1 is a vertical section, partly in elevation, of a complete plant for making pentane, or the like, with three condensations and two evaporations; Fig. 2 is a similar view of a similar but more compact plant carrying the purification somewhat further.

In Fig. 1, element 1 is a pipe leading from still or other vaporizer and serving as a source of vapors. It may communicate with manifold 2 serving to feed a plurality of condensers of similar type and function. As shown, the manifold discharges into a fractional condenser composed of tub 3, and condensing coil 4. The arrangement of simple condensing coils shown is selected for the purpose of clarity of illustration and illustrates the principle of the apparatus and its operation. In practice the simple worm shown may be replaced by more elaborate apparatus of the type of the usual column still. As shown the coil discharges into trap 5 provided with vapor outlet 6 and liquid outlet 7. In making normal pentane the water in the tub may be kept at about 27° C. The condensed liquids from 5 pass through 7 to worm 8 in tub 9 containing water at about 47°; 10 degrees higher than the boiling point of pentane. Vapor and liquid pass down into trap 10 whence unvaporized liquid may be led off through 11 while vapors go forward through 12 to coil 13 in tub 14. The liquid in the tub may be maintained at 5 degrees lower than the boiling point of pentane; at about 32° C. Condensed liquid and vapor are led into trap 15, whence vapors are sent out of the system through pipe 16 while condensed liquid passes forward through 17 to evaporating coil 18 in tub 19. The liquid in the tub may be about 5 degrees above the boiling point of pentane; say 42°. Liquid and vapor pass into trap 20, whence the liquid goes to exit through 21 while the vapor, now nearly pure pentane, goes forward through 22 to condensing coil 23 in tub 24. This may be cooled to 35° or thereabout. Vapor and liquid go to trap 25, whence vapor exits at 26 while condensed pentane goes forward through 27 to cooling coil 28 in tub 29. The pentane may now be packaged. The vapors from 26 may be returned to 1 through pipe connection 26ª if desired as they are rich in pentane but it is better to condense and reserve them for another distillation as a separate operation.

In Fig. 2 I have shown a similar but more compact organization. The operation in making pentane is exactly the same as that just described though more condensers and evaporators are shown, the apparatus being adapted to make a pentane boiling within a degree or less of 37° C. In this showing the various cooling coils are mounted in adjacent tubs or compartments and the various evaporating coils are similarly mounted in another set of tubs or compartments below the first set and separated therefrom by a heat-insulating wall 50. Gasolene vapors enter the system through 51 and pass through coil 54 in tank or tub 53. From the coil the material goes to trap 55, whence vapors go to exit through 56. As before, the cooling liquid in this tank, in making pentane, is maintained at 27° C. The liquid passes downward through 57 to coil 58 in tank 59. Communicating with this coil is trap 60 with liquid discharge 61 and vapor discharge 62 passing upwardly through the liquid in the lower tank and between the walls of adjacent upper tanks. The vapors pass into coil 63 in tank 64. Liquid and vapor are separated in trap 65 whence vapor goes to exit through 66, while liquid passes downward through 67 to coil 68 in tank 69. From trap 70 liquid passes off through 71, while vapors pass upwardly through 72 to coil 73 in tank 74. The material in trap 75 is separated into vapor passing off through 76 and liquid passing downward through 77 into coil 78 in tank 79. In the structure of Fig. 1, the material is finally condensed at 35° C., or 2 degrees below the boiling point of normal pentane and the condensate collected and packaged. In the present structure all the tanks here described may be kept at exactly the same temperatures as the corresponding temperatures in Fig. 1, viz., that in 53 at 27°, that in 59 at 47°, that in 64 at 32°, that in 69 at 42°, that in 74 at 35° and that in 79 at 39°. The liquid from trap 80 however is sent out of the system through 81, while vapors pass upward through 82 to coil 83 in tank 84. The liquid in this tank is maintained at 36°, or a degree below the boiling point of pentane. The material received in trap 85 is separated into vapor going through 86 and liquid going downward through 87 to coil 88 in tank 89. The liquid in this tank may be maintained at a degree above the boiling point of pentane, or 38°. The material received in trap 90 is separated into liquid which passes out of the system at 91 while vapors pass upward through 92 to coil 93 in tank 94. The liquid in this tank may be maintained at a half-a-degree below the boiling point of pentane, or 36.5°. The material received in the trap 95 is separated into vapor which passes off through 96 while the liquid passes downward through 97 into coil 98 in tub or tank 99. The liquid in this tank may be maintained at a half-a-degree above the boiling point of pentane, or 37.5°. The material received in trap 100 is separated into vapors which pass off at 101 and liquid which passes off at 102. The vapors produced at 37.5° are substantially pure pentane. They may be condensed, cooled and packaged.

Cooling and heating liquid, such as water, may be led systematically through the several tanks or tubs shown. Water may, for example, enter the upper or condensing devices through 103, pass therethrough and thence through 104 into the next tank and so on successively through the cooling system. Similarly, warm water may enter the lower or heating devices through 105 and pass successively, as by successive connections 106, through the rest of the devices in series. This makes a very convenient arrangement.

What I claim is:—

1. The process of distilling which comprises transmitting a substance containing a volatile component which it is desired to recover alternately through a series of vaporizers and condensers maintained at temperatures which progressively approach each other and approach the boiling point of the component to be recovered.

2. The process of recovering definite bodies from petroleum oils which comprises transmitting such an oil through a series of vaporizers and condensers maintained at temperatures which progressively approach each other and approach the boiling point of the component to be recovered.

3. The process of recovering a pentane which comprises transmitting gasolene through a series of vaporizers and condensers maintained at temperatures which progressively approach each other and approach the boiling point of such pentane, unvaporized material from the vaporizers and uncondensed material from the condensers being taken out of the system at each operation.

4. The process of recovering normal pentane which comprises passing gasolene vapors through a condenser maintained at a temperature near but below the boiling point of such pentane, rejecting uncondensed vapors and passing the vapors through vaporizer maintained at a temperature near but above the boiling point of such pentane, rejecting the unvaporized liquid and repeating the operation with a condenser and a vaporizer approaching still nearer the boiling point of such pentane.

5. In the manufacture of normal pentane, the process which comprises transmitting gasolene vapors through a condenser maintained at about 27° C., transmittitng the condensed liquid through a vaporizer maintained at about 47° C., transmitting the vapor through a condenser maintained at about 32° C., transmitting the condensate through a vaporizer at about 42° C. and passing the vapor through a condenser at about 35° C.

6. In the manufacture of normal pentane, the process which comprises transmitting gasolene vapors through a condenser maintained at about 27° C., transmitting the condensed liquid through a vaporizer maintained at about 47° C., transmitting the vapor through a condenser mantained at about 32° C., transmitting the condensate through a vaporizer at about 42° C., passing the vapor through a condenser at about 35° C., passing the condensate through a vaporizer at about 39° C. and passing the vapor through a condenser at about 36° C.

7. In the manufacture of normal pentane, the process which comprises transmitting gasolene vapors through a condenser maintained at about 27° C., transmitting the condensed liquid through a vaporizer maintained at about 47° C., transmitting the vapor through a condenser maintained at about 32° C., transmitting the condensate through a vaporizer at about 42° C., passing the vapor through a condenser at about 35° C., passing the condensate through a vaporizer at about 39° C., passing the vapor through a condenser at about 36° C., passing the liquid through a vaporizer at about 38° C., transmitting the vapor through a condenser at about 36.5° C., transmitting the condensate through a vaporizer at about 37.5 C., and condensing the vapors to form liquid normal pentane.

8. In a fractionating apparatus, the combination of a series of successive condensers and a series of vaporizers, means for feeding vapors to the first condenser in series, means for transmitting condensate from each condenser to the next vaporizer in series, means for transmitting vapors from each vaporizer to the next condenser in series, means for withdrawing uncondensed vapor from each condenser, means for withdrawing unvaporized liquid from each vaporizer, means for maintaining the successive vaporizers at progressively decreasing temperatures and means for maintaining the successive condensers at progressively increasing temperatures.

9. In a fractionating apparatus, the combination of a series of successive condensers and a series of vaporizers, means for feeding vapors to the first condenser in series, means for transmitting condensate from each condenser to the next vaporizer in series, means for transmitting vapors from each vaporizer to the next condenser in series, means for withdrawing uncondensed vapor from each condenser, means for withdrawing unvaporized liquid from each vaporizer and means for maintaining the required differential difference in temperature between the vaporizers and between the condensers automatically at the desired level, such means comprising means for admitting temperature adjusting fluid successively past the said condensers in the series of increasing temperature and thence successively past the said vaporizers in the order of increasing temperature.

In testimony whereof, I affix my signature in the presence of two subscribing witnesses.

WALTER O. SNELLING.

Witnesses:
D. T. BROWN,
M. R. McKEOWN.